(12) United States Patent
Nakashima

(10) Patent No.: US 10,520,122 B2
(45) Date of Patent: Dec. 31, 2019

(54) CONNECTOR

(71) Applicant: NICHIRIN CO., LTD., Hyogo (JP)

(72) Inventor: Kazutoshi Nakashima, Hyogo (JP)

(73) Assignee: NICHIRIN CO., LTD., Hyogo (JP)

( * ) Notice: Subject to any disclaimer, the term of this patent is extended or adjusted under 35 U.S.C. 154(b) by 0 days.

(21) Appl. No.: 15/764,709

(22) PCT Filed: Sep. 14, 2016

(86) PCT No.: PCT/JP2016/077095
§ 371 (c)(1),
(2) Date: Mar. 29, 2018

(87) PCT Pub. No.: WO2017/056990
PCT Pub. Date: Apr. 6, 2017

(65) Prior Publication Data
US 2019/0040984 A1    Feb. 7, 2019

(30) Foreign Application Priority Data
Oct. 2, 2015   (JP) ................... 2015-197135

(51) Int. Cl.
*F16L 37/12*    (2006.01)
*F16L 37/088*   (2006.01)

(52) U.S. Cl.
CPC ....... *F16L 37/1225* (2013.01); *F16L 37/0885* (2019.08); *F16L 2201/10* (2013.01)

(58) Field of Classification Search
CPC .................................................. F16L 37/1225

(Continued)

(56) References Cited

U.S. PATENT DOCUMENTS 7,481,463 B2 * 1/2009 Ishida ................ F02M 37/0017
285/190
7,677,608 B2 * 3/2010 Takayanagi ........... F16L 37/144
285/305

(Continued)

FOREIGN PATENT DOCUMENTS

JP     2004-003588 A    1/2004
JP     2005-214240 A    8/2005

(Continued)

OTHER PUBLICATIONS

International Search Report issued in PCT/JP2016/077095 dated Nov. 22, 2016 (2 pages).

(Continued)

*Primary Examiner* — Anna M Momper
*Assistant Examiner* — Fannie C Kee
(74) *Attorney, Agent, or Firm* — Osha Liang LLP

(57) ABSTRACT

A connector connectable to a pipe having an annular protrusion on an end portion outer circumference thereof includes a connector main body having, at an end thereof, a pipe insertion hole into which the pipe is inserted; a checker to be pushed in from a temporary stopping position with respect to the connector main body to a completely inserted position with respect to the connector main body; and a retainer disposed inside the connector main body, which is configured to restrict a movement of the checker from the temporary stopping position to the completely inserted position, before the pipe is inserted into the connector main body. The retainer has a retainer lock part in a lower end portion of the retainer. A retainer-locker, which locks the retainer lock part, is provided in a bottom portion on a pipe insertion hole side of the connector main body.

5 Claims, 12 Drawing Sheets

(58) Field of Classification Search
USPC .................................. 285/93, 305, 308, 319
See application file for complete search history.

(56) References Cited

U.S. PATENT DOCUMENTS

| | | | |
|---|---|---|---|
| 9,016,729 B2* | 4/2015 | Ishida | F16L 37/088 |
| | | | 285/308 |
| 2010/0019483 A1 | 1/2010 | Bokuhn et al. | |
| 2010/0052315 A1 | 3/2010 | Kerin et al. | |

FOREIGN PATENT DOCUMENTS

| | | |
|---|---|---|
| JP | 2014-178029 A | 9/2014 |
| JP | 2015-048898 A | 3/2015 |

OTHER PUBLICATIONS

Written Opinion of the International Searching Authority issued in PCT/JP2016/077095 dated Nov. 22, 2016 (3 pages).
Notification of Decision to Grant a Patent from Japanese application No. 2015-197135 dated Jan. 13, 2016 (6 pages).
Extended Search Report issued in European Application No. 16851164.0, dated Aug. 14, 2018 (7 pages).
Office Action issued in Chinese Application No. 201680057019.7; dated Jun. 5, 2019 (12 pages).

* cited by examiner

A-A CROSS SECTION

PLAN VIEW

SIDE VIEW

SIDE VIEW   FRONT VIEW

BOTTOM VIEW

PLAN VIEW

FRONT VIEW

B-B CROSS SECTION (COMPLETELY INSERTED POSITION)

(INTERMEDIATE POSITION)

(TEMPORARY STOPPING POSITION)

CONNECTOR

CROSS-REFERENCE TO RELATED APPLICATIONS

This application is a National Stage application of International Patent Application No. PCT/JP2016/077095, filed on Sep. 14, 2016, which claims priority to Japanese Patent Application No. JP 2015-197135 A, filed on Oct. 2, 2015. Both applications are hereby incorporated in their entirety.

TECHNICAL FIELD

The present invention relates to a connector used in connecting conduits such as fuel conduits, the connector having a check function that allows checking from outside if pipe connection is completely done.

BACKGROUND ART

As a connector having the above-described check function, there is a connector described in PTL 1 for example. The connector described in PTL 1 is structured so that a retainer, which is stretched out by a spool portion (annular protrusion) of a pipe, is slid towards a pipe insertion hole, in a direction opposite to the pipe-insertion direction, with an elastic restoring force of the retainer restoring its original shape, and with the slide of the retainer, it is possible to push in a checker from a temporary stopping position to a completely inserted position of the connector main body.

With this, the retainer moves towards the pipe insertion hole, in a direction opposite to the pipe-insertion direction. Therefore, there is no need of providing a space for accommodating the retainer, in a farther inside of the connector main body relative to the pipe-insertion direction. Therefore, the length of the connector main body is reduced (the connector main body is made compact).

CITATION LIST

Patent Literature

[PTL 1] Japanese Unexamined Paten Publication No. 2015-48898

SUMMARY OF INVENTION

Technical Problem

The connector of PTL 1 however leaves the following problems yet to be addressed. A protrusion is provided in a middle portion of an outer bottom surface of the retainer, and in a middle portion in the width direction of the bottom portion of a retainer accommodation unit of the connector main body, a long hole serving as a guide hole is provided, which extends from substantially an end to the other end relative in the axial direction. The retainer slides, the protrusion of the retainer inserted in the long hole.

Here, when a pipe is inserted into the connector main body, the retainer slides and moves in a direction opposite to the pipe-insertion direction due to its elastic restoring force. However, this elastic restoring force that serves as a driving force for the slide movement causes unintended movements of the retainer. The unintended movements of the retainer hinders smooth connection of the connector with the pipe.

Further, since the protrusion of the retainer is simply placed in the long hole formed in the bottom portion of the retainer accommodation unit, the retainer is not particularly restricted from moving in the up-down directions in the retainer accommodation unit. Therefore, for example, when the connector is subject to vibration at the time of shipping and the like, the protrusion of the retainer may depart from the long hole, thus causing the retainer to be out of a predetermined position in the retainer accommodation unit. When the retainer gets out of the predetermined position, the retainer does not move as intended (slide movement) even when the pipe is inserted into the connector main body, and does not exert its function.

The present invention is made in view of the above circumstances, and it is an object of the present invention to provide a connector having a structure such that unintended movement of the retainer is less likely to take place, and that the retainer is kept from getting out of the predetermined position even when it is subjected to vibration during shipping or the like situation.

Solution to Problem

The present invention is a connector connectable to a pipe having an annular protrusion on its end portion outer circumference, the connector comprising: a connector main body having, at an end thereof, a pipe insertion hole into which the pipe is inserted; a checker to be pushed in from a temporary stopping position with respect to the connector main body to an completely inserted position with respect to the connector main body; and a retainer disposed inside the connector main body, which is configured to restrict a movement of the checker from the temporary stopping position to the completely inserted position, before the pipe is inserted into the connector main body. The retainer has a retainer lock part in its lower end portion, and a retainer-locker which locks the retainer lock part is provided in a bottom portion on a pipe insertion hole side of the connector main body. By inserting the pipe into the connector main body from the pipe insertion hole, the retainer swings toward the pipe insertion hole side with the retainer lock part as a fulcrum, thus enabling the checker to be pushed in from the temporary stopping position to the completely inserted position with respect to the connector main body.

Advantageous Effects of Invention

With the present invention, the retainer swings with the retainer lock part as a fulcrum, while the retainer lock part in the lower end portion of the retainer is locked by the retainer-locker in the bottom portion on the pipe insertion hole side of the connector main body. When slide movement of the retainer is compared with swinging of the retainer with its locked lower end portion as a fulcrum, the latter case, i.e., swinging of the retainer less likely causes unintended movement of the retainer. Further, with the retainer lock part in the lower end portion of the retainer being locked by the retainer-locker in the bottom portion of the connector main body, the retainer does not get out of a predetermined position even if it is subjected to vibration due to shipping and the like situation, unless the retainer lock part is disengaged with the retainer-locker.

DESCRIPTION OF EMBODIMENTS

The following describes an embodiment of the present invention with reference to attached drawings.

(Structure of Connector)

Figure 1:
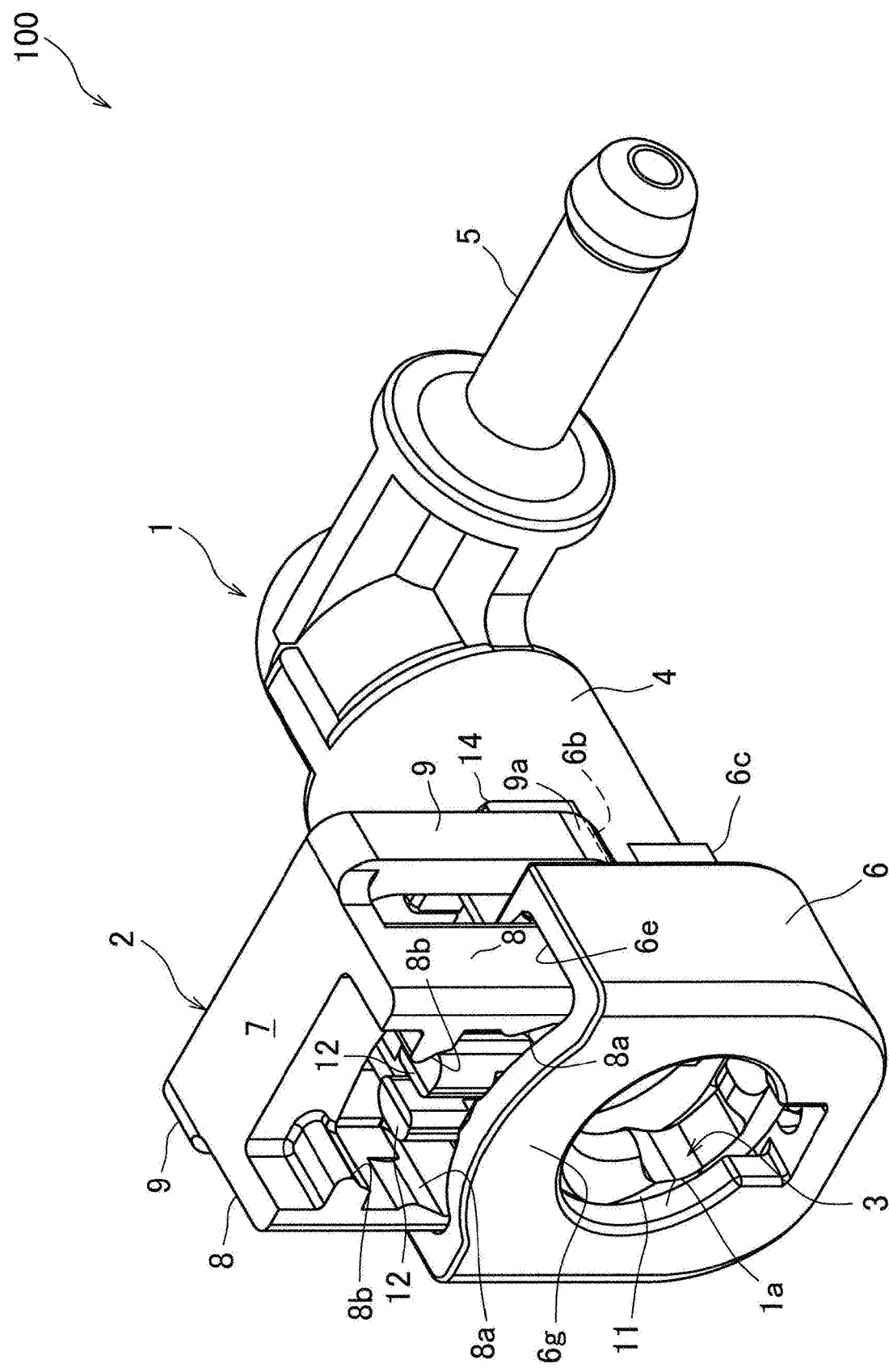
FIG. 1 A perspective view of a connector related to one embodiment of the present invention.

As shown in FIG. 1, a connector 100 which is one embodiment of the present invention is structured by a connector main body 1, a checker 2, and a retainer 3. This connector 100 is a conduit joint used for connecting conduits such as fuel conduits and the like.

<Connector Main Body>

Figure 2:
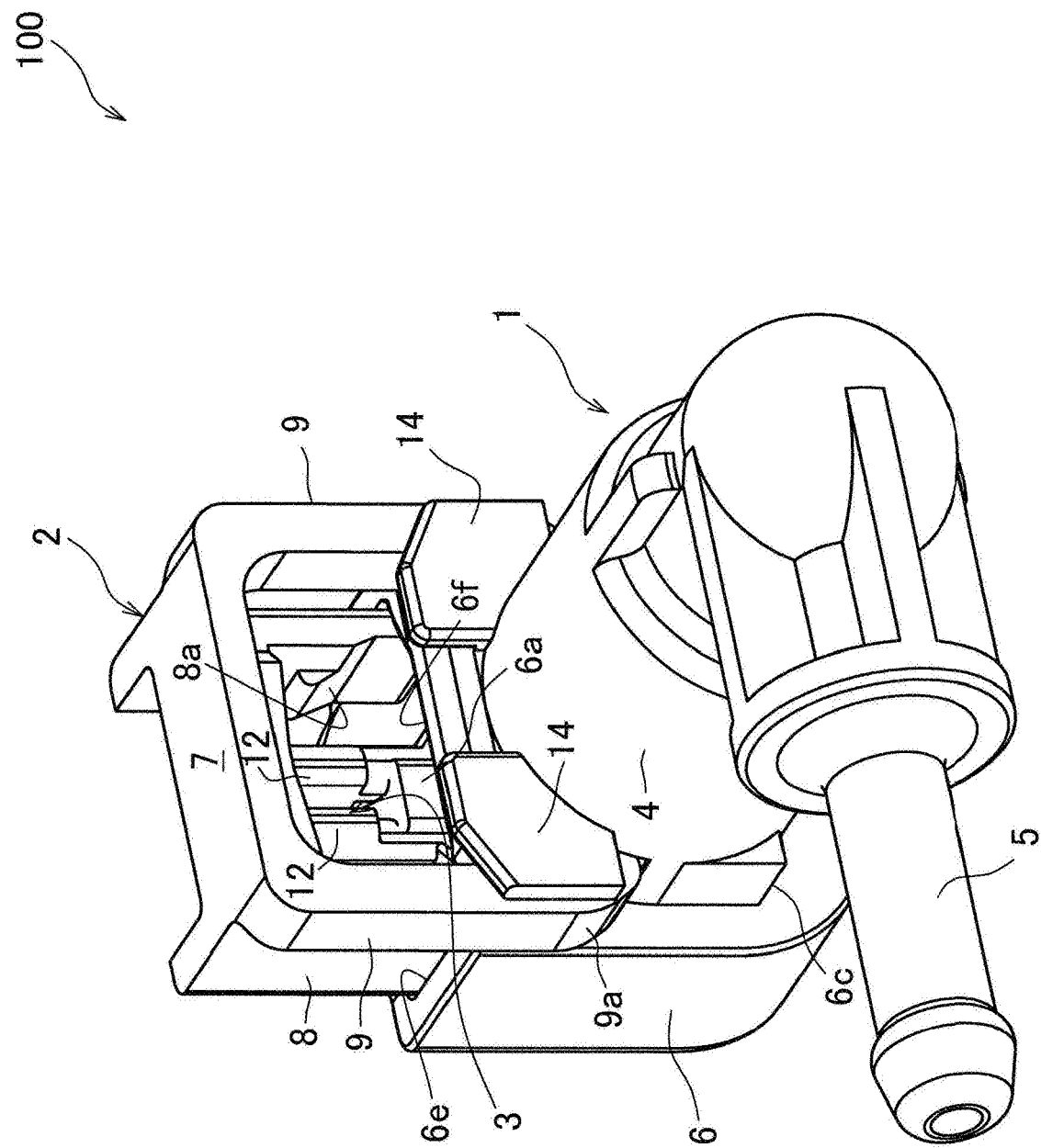
FIG. 2 A perspective view of the connector viewed from a direction different from FIG. 1.
Figure 3:
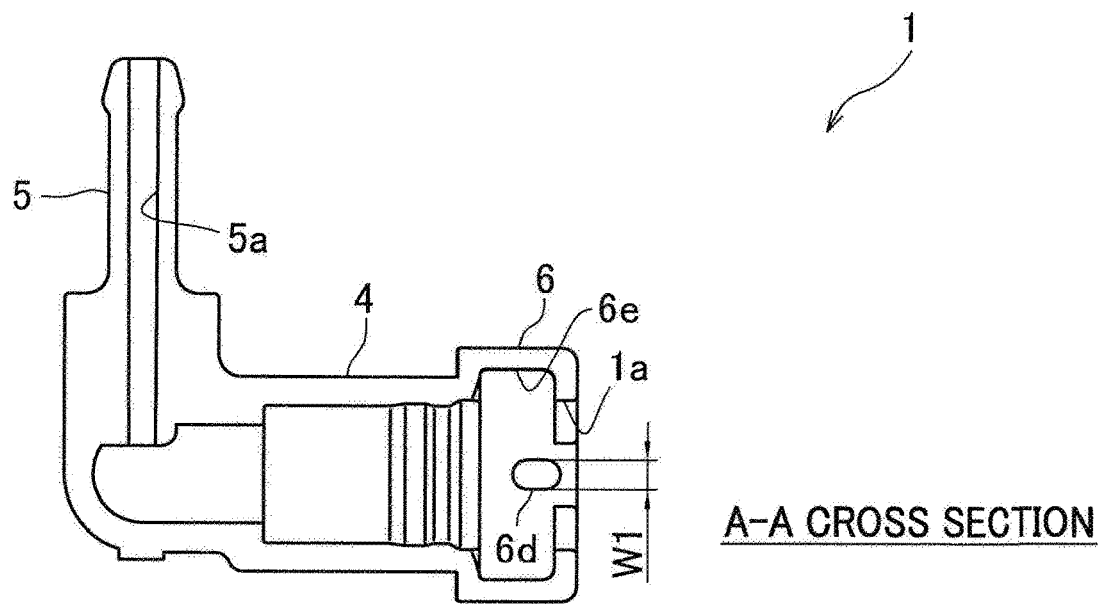
FIG. 3 A single article drawing of a connector main body shown in FIG. 1 and FIG. 2.
Figure 3:
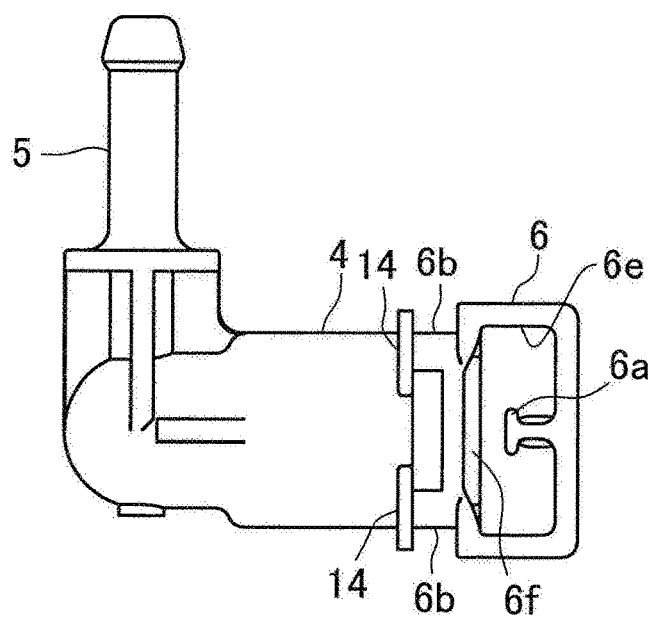
Figure 3:
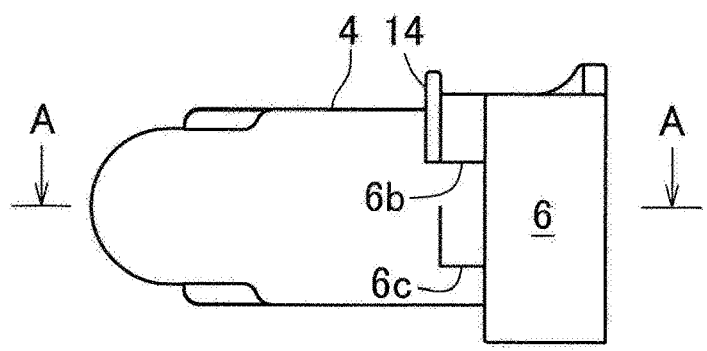

Next, the following mainly describes the connector main body 1 with reference to FIG. 1 to FIG. 3. The connector main body 1 is a main component of the connector 100, and includes a pipe-insertion part 4 formed on an end portion of a retainer accommodation unit 6, and a hose-connecting part 5 extended from the pipe-insertion part 4. The connector main body 1 has an L-shape in the present embodiment. In other words, the axial direction of the pipe-insertion part 4 and the axial direction of the hose-connecting part 5 are perpendicular to each other. It should be noted that the relation between the axial direction of the pipe-insertion part 4 and the axial direction of the hose-connecting part 5 is not limited to perpendicular. For example, the pipe-insertion part 4 and the hose-connecting part 5 may be arranged along a single axis. The material of the connector main body 1 is, for example, a resin.

The retainer accommodation unit 6 has a rounded hollow rectangular parallelepiped shape, and its front surface has a pipe insertion hole 1a into which a pipe 50 is inserted, and its upper end portion is formed as a rectangular opening 6e in a plan view. In the opening 6e, there is provided a protrusion 6a which protrudes from an inner wall surface of the upper end portion in a direction of inserting the pipe 50. Further, in the bottom portion of the retainer accommodation unit 6 (in the bottom portion on the pipe insertion hole 1a side of the connector main body 1), there is formed a locking hole 6d serving as a retainer-locker. It should be noted that the tip portion of the protrusion 6a is on the inner side (on a side closer to the pipe-insertion part 4) than the center of the locking hole 6d, in a plan view (see plan view of FIG. 3).

The locking hole 6d is a hole in which a later-described retainer lock part 13 provided in the lower end portion of the retainer 3 is fitted. The locking hole 6d is a long hole instead of a circular hole to leave some space so that the retainer 3 is easily swingable. The following details the shape and dimensions of the locking hole 6d with reference to FIG. 6A and the diagram on the right of FIG. 7C (C-C cross section). As shown on the right side diagram of FIG. 7C, inner wall surfaces on both sides of the locking hole 6d relative to the width direction are each a slope surface S1. The width dimension W1, which is a narrowest part of the inner bottom surface portion of the retainer accommodation unit 6, is narrower than the external diameter (W2 in FIG. 5) of the retainer lock part 13. As shown in FIG. 6A, the inner wall surface of the locking hole 6d, on the opposite side to the side of the pipe insertion hole 1a relative to the length direction, is a slope surface S2 which expands the hole downward. The inner wall surface on the side of the pipe insertion hole 1a is a surface extended straight downward, without being inclined. Further, the thickness of the locking hole 6d (thickness of the bottom wall of the retainer accommodation unit 6) is such that the retainer lock part 13 does not protrude from the outer bottom surface of the retainer accommodation unit 6.

Figure 6A:
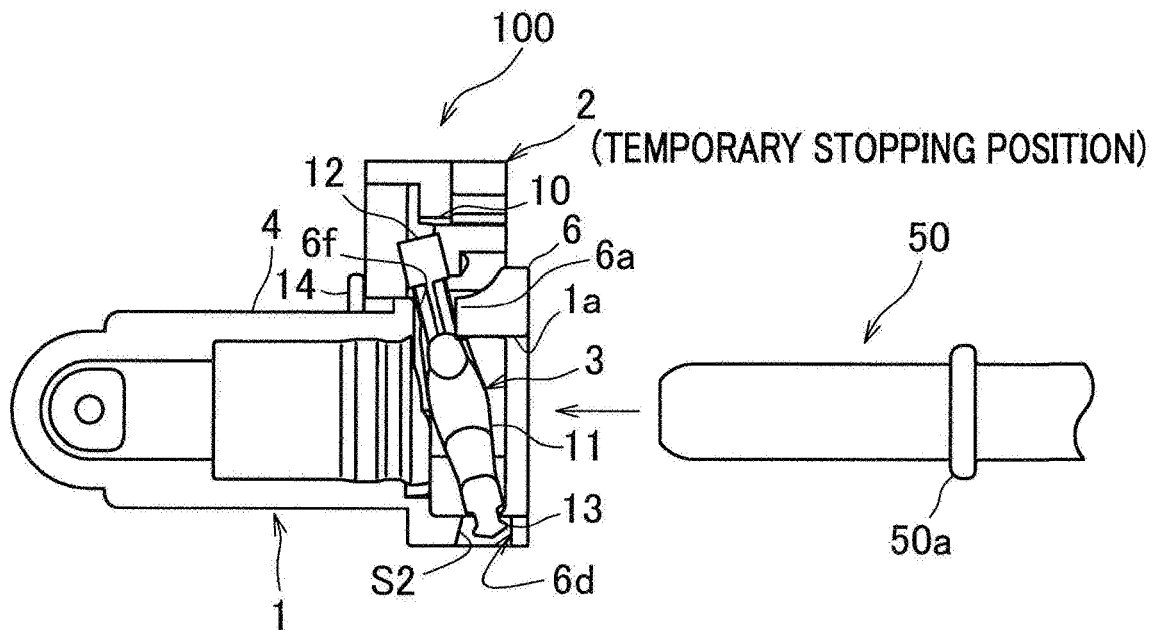
FIG. 6A A side view (cross section) showing a state where a pipe is to be connected to the connector shown in FIG. 1 and FIG. 2.
Figure 7A:
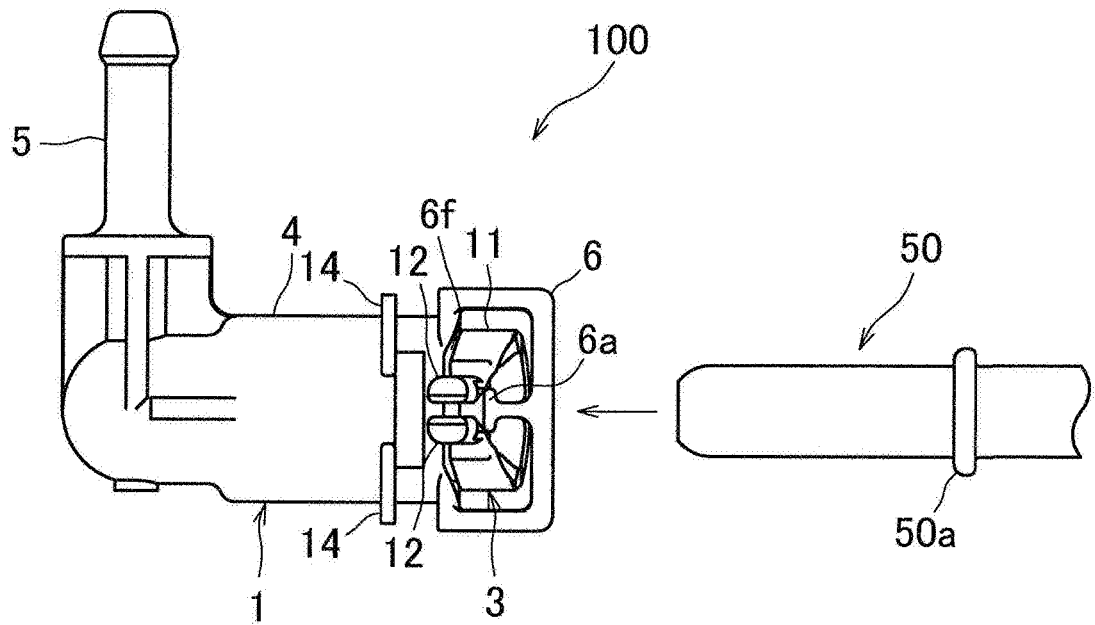
FIG. 7A A plan view showing a state where a pipe is to be connected to the connector shown in FIG. 1 and FIG. 2 (illustration of the checker omitted).
Figure 7B:
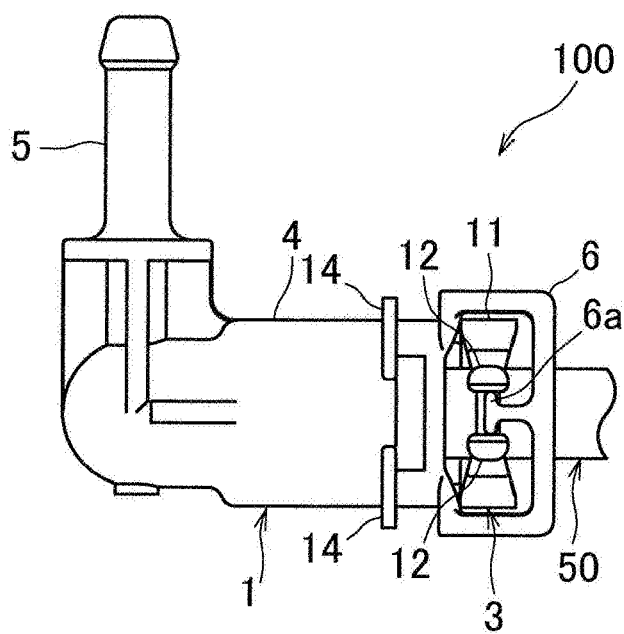
FIG. 7B A plan view showing a state where the pipe is being connected to the connector shown in FIG. 1 and FIG. 2 (illustration of the checker omitted).

An upper portion of an inner wall surface, out of the inner wall surfaces of the retainer accommodation unit 6, which faces the pipe insertion hole 1a is a slope surface 6f against which the retainer 3 is leaned (see plan view of FIG. 3, FIG. 6A and FIG. 7A).

An upper portion 6g of the front wall of the retainer accommodation unit 6 (see FIG. 1), i.e., the upper portion 6g of the pipe insertion hole 1a, has an arc shape that matches with the outline of the pipe insertion hole 1a.

On the back surface of the retainer accommodation unit 6, a pair of left and right checker-locking parts 6b are provided on both sides of the upper portion of the cylindrical pipe-insertion part 4, and another pair of left and right checker-locking parts 6c are provided on both sides of the lower portion of the cylindrical pipe-insertion part 4. These checker-locking parts 6b and 6c each serve as a portion which locks a later-described lock claw 9a (see FIG. 4) of the checker 2.

Further, immediately behind the checker-locking parts 6b and 6C, pairs of left and right plate members 14 (plates) each having a predetermined height are provided (e.g., see FIG. 2).

Inside the hose-connecting part 5, a path 5a for a fluid is provided, and a not-shown hose is connectable to this hose-connecting part 5.

<Checker>

Figure 4:
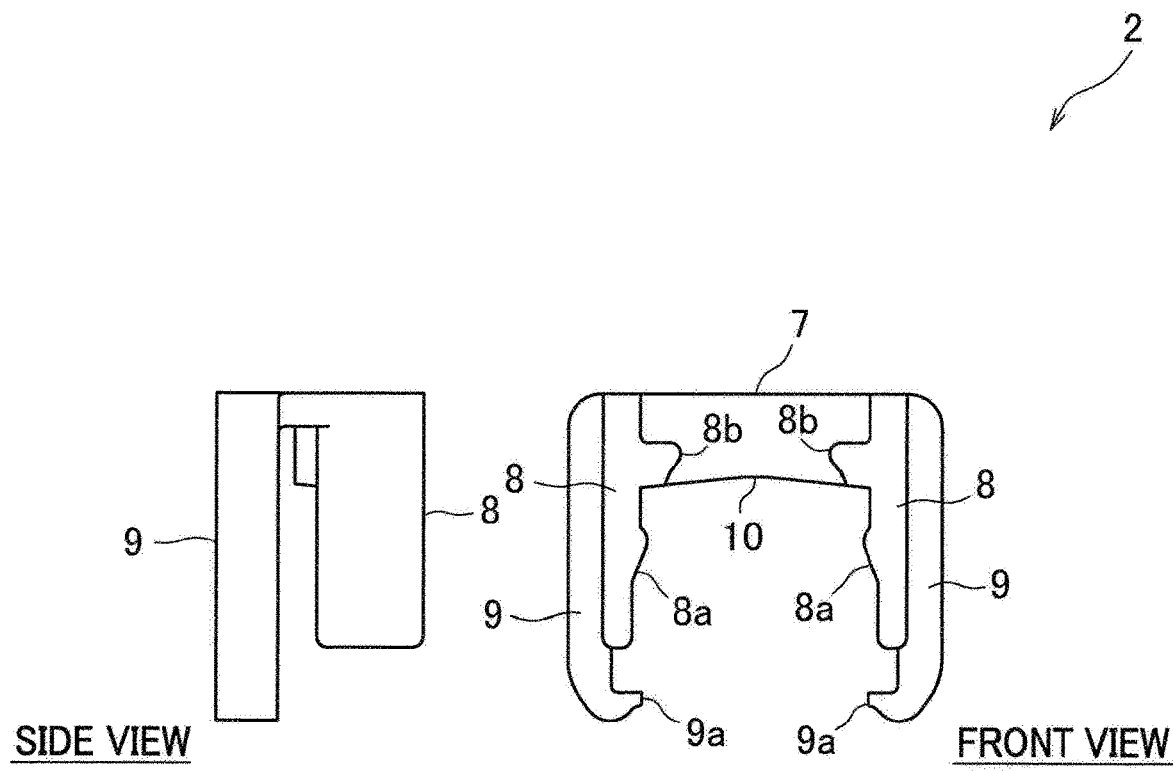
FIG. 4 A single article drawing of a checker shown in FIG. 1 and FIG. 2.
Figure 4:
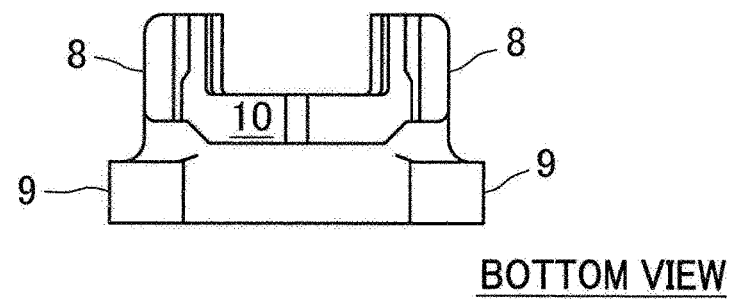
Figure 6B:
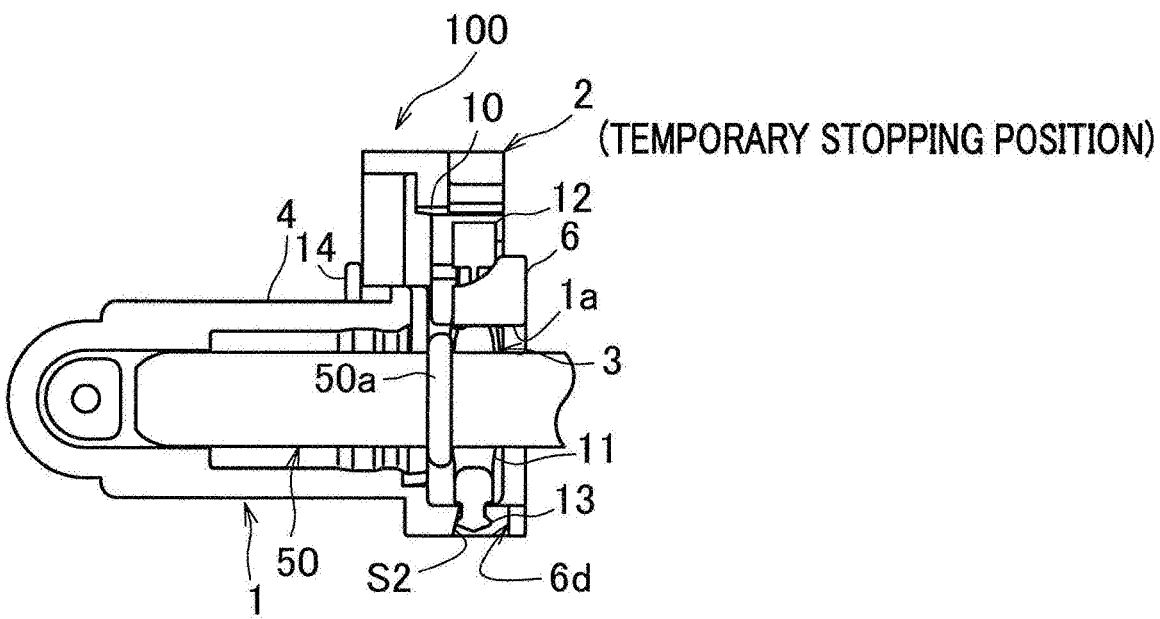
FIG. 6B A side view (cross section) showing a state where the pipe is being connected to the connector shown in FIG. 1 and FIG. 2.
Figure 6C:
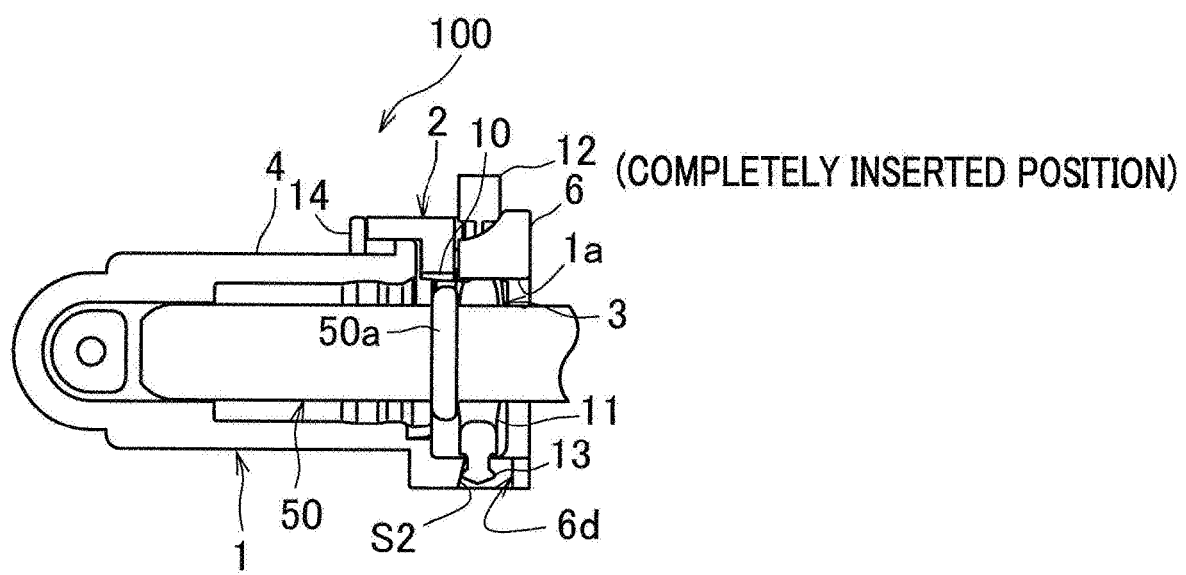
FIG. 6C A side view (cross section) showing a state after the pipe is connected to the connector shown in FIG. 1 and FIG. 2.

The following describes the checker 2 with reference to FIG. 1, FIG. 2, and FIG. 4. The checker 2 is a member having a function of confirming from outside whether or not connection of the pipe 50 to the connector main body 1 is in a complete state, and is pushed into the connector main body 1, from a temporary stopping position with respect to the connector main body 1 to the completely inserted position with respect to the connector main body 1. FIG. 6A to FIG. 6C should be referred to, as to the temporary stopping position and the completely inserted position, which will be described later.

The checker 2 includes: a rectangular press part 7 configured to be pressed by a human finger; locking arm portions 9 for the connector main body 1, which extend downwards from both left and right end portions of the press part 7; and retainer holding pieces 8 extended downward from both the left and right end portions of the press part 7, as is the case with the locking arm portions 9. Further, on the lower surface of the press part 7, a contact portion 10 for legs 12 of the later-described retainer 3 is provided. The material of the checker 2 is, for example, a resin.

The tip of each of the locking arm portions 9 is formed as a locking claw 9a which is to be hooked on the corresponding one of the checker-locking parts 6b, 6c provided to the connector main body 1. Further, portions of the retainer holding pieces 8 from their tips to the middle serve as retainer holders 8a which hold, in a sandwiching manner from both sides, a main body 11 of the later-described retainer 3. Specifically, the shapes of the surfaces of the retainer holders 8a are shaped to match the outline of the main body 11 of the retainer 3. In other words, the surfaces of the retainer holders 8a facing each other each has a curved surface that contacts the outer surface of the main body 11 of the retainer 3. Further, in an upper portion of the retainer holder 8a out of the inner side surface of the retainer holding piece 8, a rib 8b (protrusion) is provided which spreads the main body 11 of the retainer 3, by abutting against the outside surface of the leg 12 of the retainer 3.

<Retainer>

Figure 5:
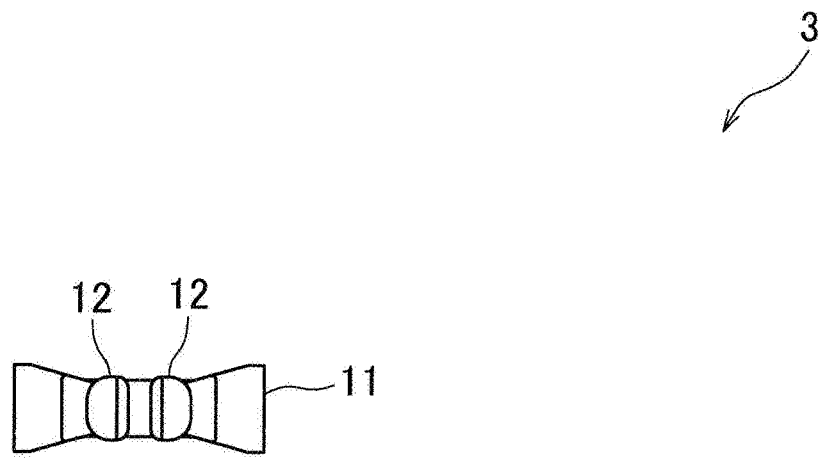
FIG. 5 A single article drawing of a retainer shown in FIG. 1 and FIG. 2.
Figure 5:
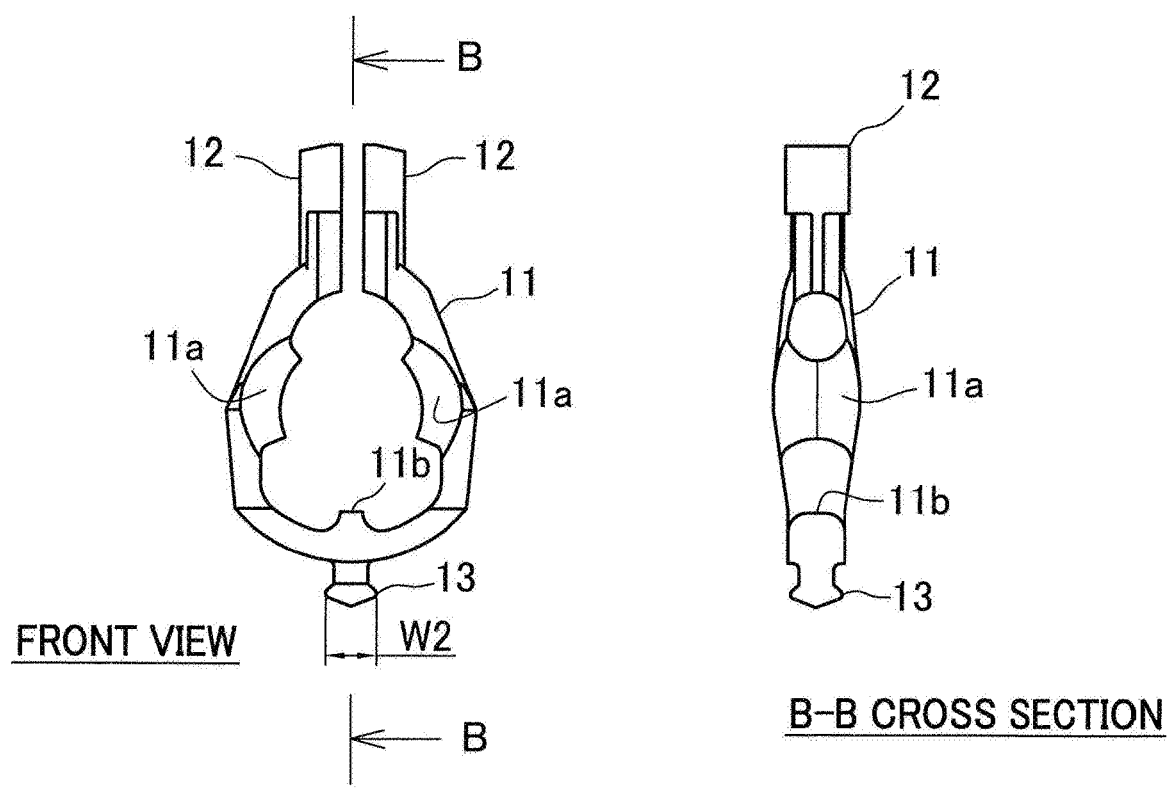

The following describes the retainer 3 with reference to FIG. 1, FIG. 2, and FIG. 5. The retainer 3 is disposed inside the retainer accommodation unit 6 of the connector main body 1 (see FIG. 1), which is configured to restrict a movement of the checker 2 with respect to the connector main body 1, from the temporary stopping position to the completely inserted position, before the pipe 50 is inserted into the connector main body 1.

The retainer 3 includes a C-shaped main body 11 which is deformed to spread when the pipe 50 is inserted, and a pair of legs 12 extended upward (outward) from ends of a cutout portion of the main body 11. The material of the retainer 3 is, for example, a resin or metal.

As described above, the C-shaped main body 11 is formed so it is elastically deformable. On the inner side surfaces (inside portions) of the main body 11 facing each other, there are protrusions 11a each having a mountain-like shape and slightly protruding towards the center. In a middle portion of the inner bottom surface (inside portion) of the main body 11, there is a protrusion 11b having a mountain-like shape and slightly protruding towards the center. Further, in a middle portion on the outer bottom surface of the main body 11, there is provided the retainer lock part 13 which protrudes downward (outward) and whose tip is formed as a diameter-enlarged portion. The retainer lock part 13 is in a position corresponding to the middle of the space between the two legs 12 of the retainer 3, in a plan view. Further, as should be understood from the front view of the retainer 3 in FIG. 5, the direction in which the retainer lock part 13 protrudes and the direction in which the legs 12 extend are 180 degrees different from each other, in a plan view of the retainer 3. Further, the retainer 3 has a shape which is symmetrical with respect to the left and right and front and back. The two legs 12 are parallel to each other.

(Movement of Components of Connector, when Connecting Pipe to Connector)

With reference to FIG. 6A to FIG. 6C, and FIG. 7A to FIG. 7C, the following describes movements of components of the connector 100, when the pipe 50 is connected to the connector 100. It should be noted that the pipe 50 to be connected to the connector 100 has, on its end portion outer circumference, a spool portion 50a (annular protrusion).

<Before Insertion of Pipe>

Before the pipe 50 is inserted into the connector main body 1, the checker 2 is temporarily held on the connector main body 1, while being protruding upward from the retainer accommodation unit 6 of the connector main body 1, as shown in FIG. 6A. The locking claws 9a at the tips of the locking arm portions 9 of the checker 2 are hooked on to the checker-locking parts 6b provided to the connector main body 1 (see FIG. 1), and the checker 2 is locked to the connector main body 1 in the temporary stopping position shown in FIG. 6A.

The following describes temporary fixation of the checker 2. When the pair of left and right retainer holding pieces 8 of the checker 2 are inserted from above into the retainer accommodation unit 6 of the connector main body 1, the pair of left and right locking arm portions 9 of the checker 2 behind the retainer holding pieces 8 contact the connector main body 1 and spreads outwardly (elastically deformed), and then the locking claws 9a enter the checker-locking parts 6b provided to the connector main body 1. This keeps the checker 2 from being easily pulled out from the connector main body 1.

The retainer 3 has the retainer lock parts 13 at its lower end portion fitted in the locking holes 6d formed in the bottom portion of the retainer accommodation unit 6, and is leaned against the slope surface 6f of the retainer accommodation unit 6. On the front side (the side of the pipe insertion hole 1a) nearby the two legs 12 of the retainer 3, a protrusion 6a provided to the retainer accommodation unit 6 is positioned. This protrusion 6a prevents the retainer 3 from swing towards the pipe insertion hole 1a.

At this time, the contact portion 10 of the checker 2 is above the two legs 12 of the retainer 3. Therefore, even if the checker 2 is pressed with respect to the connector main body 1, the lower surface of the contact portion 10 of the checker 2 abuts the upper end of the two legs 12 of the retainer 3, which hinders the checker 2 from being further pressed in with respect to the connector main body 1 (see FIG. 6A).

The pair of left and right plate members 14 provided to the connector main body 1 prevent a situation in which a finger enters from the gap between the pair of left and right locking arm portions 9 of the checker 2 and presses the two legs 12 of the retainer 3, consequently causing an inadvertent swing movement of the retainer 3 towards the pipe insertion hole 1a.

It should be noted that the position of the retainer 3 in the retainer accommodation unit 6 shown in FIG. 1 and FIG. 2 is in the state after the not-shown pipe 50 is inserted all the way into the connector main body 1 (the state after the swing movement).

<Insertion of Pipe>

The pipe 50 is inserted into the connector main body 1 through the pipe insertion hole 1a. When the pipe 50 is inserted, the spool portion 50a of the pipe 50 abuts the slope surfaces of the protrusions 11a of the main body 11 of the retainer 3, which surfaces facing the pipe insertion hole 1a. By further inserting the pipe 50, the spool portion 50a spreads the protrusions 11a, thereby expanding the main body 11. This way, the two legs 12 of the retainer 3 are also spread, thereby enabling the swing movement of the retainer 3 towards the pipe insertion hole 1a which has been restricted by the protrusion 6a provided to the retainer accommodation unit 6 (see FIG. 7B).

By even further inserting the pipe 50 (fully inserting the pipe 50 into the pipe-insertion part 4), the spool portion 50a of the pipe 50 gets over the vertices of the protrusions 11a of the main body 11 of the retainer 3. Then, the retainer 3 swings, with its retainer lock part 13 as a fulcrum, towards the pipe insertion hole 1a, i.e., in a direction opposite to the direction of inserting the pipe 50, by the push of the spool portion 50a by the slope surfaces on the other side of the protrusions 11a and by a repulsive force attributed to the elastic restoring force of the main body 11 of the retainer 3 (see FIG. 6B and FIG. 7C). This way, the legs 12 of the retainer 3 departs from the space below the contact portion 10 of the checker 2, thus enabling pushing in of the checker 2 with respect to the connector main body 1.

Then, by pressing the press part 7 of the checker 2 with a finger, the checker 2 is pushed in with respect to the connector main body 1. When the checker 2 is pushed in, the locking claws 9a at the tips of the pair of left and right locking arm portions 9 of the checker 2 enters the checker-locking parts 6c provided to the connector main body 1, thereby locking the checker 2 to the connector main body 1 (see FIG. 6C). The position of the checker 2 with respect to the connector main body 1 at this point is the completely inserted position of the checker 2 with respect to the connector main body 1 (completion of the pipe 50 to the connector 100).

Figure 7C:
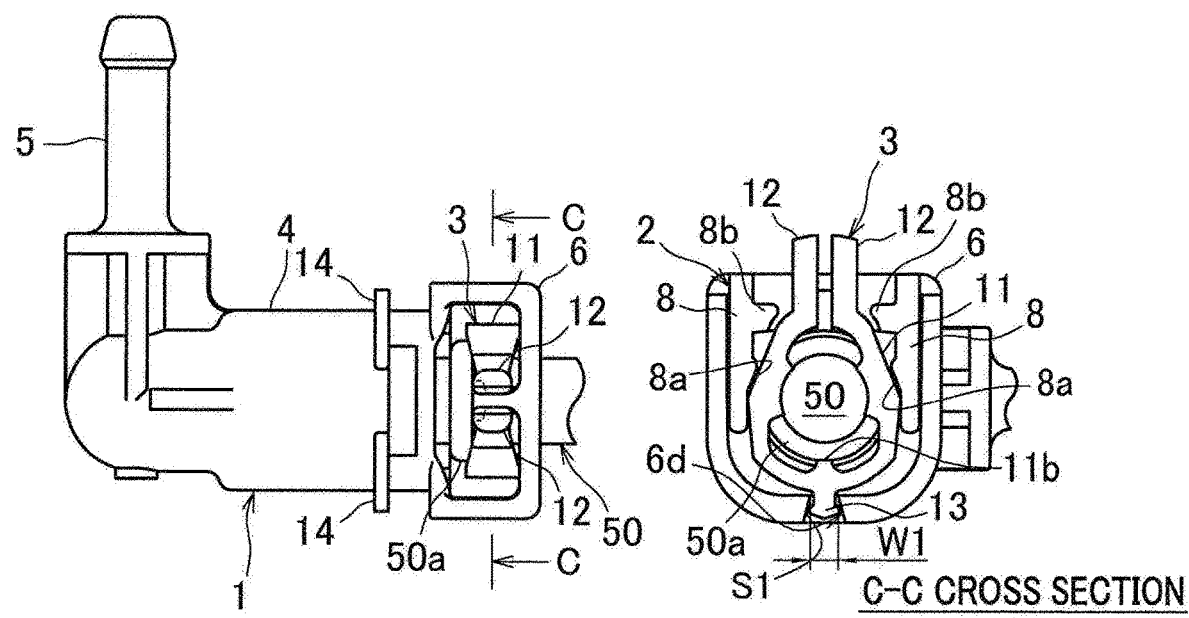
FIG. 7C A plan view showing a state after the pipe is connected to the connector shown in FIG. 1 and FIG. 2 (illustration of the checker omitted). Note that the cross sectional view taken along the line C-C in FIG. 7C partially omits illustration of the checker.

At this time, the main body 11 of the retainer 3 is held by the checker 2 while both sides of the retainer 3 being sandwiched by the pair of left and right retainer holders 8a of the retainer holding pieces 8 of the checker 2 (C-C cross sectional view of FIG. 7C It should be noted that the pipe-insertion part 4 of the connector main body 1 has therein a sealing member such as an O-ring, although illustration of this is omitted in FIG. 3, FIG. 6A to FIG. 6C. That is, in FIG. 6B and FIG. 6C for example, there is a sealing member such as an O-ring between the pipe 50 and the outside wall of the pipe-insertion part 4. This sealing member prevents leakage of the liquid such as a fuel.

(Pulling Out Pipe from Connector)

Figure 8A:
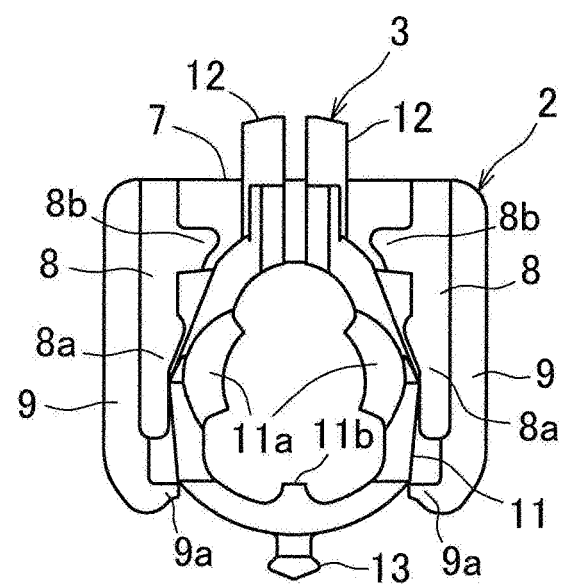
FIG. 8A A front view showing mutual positional relation between the checker and the retainer, at a time of pulling out the pipe from the connector shown in FIG. 1 and FIG. 2, wherein the checker is positioned at an completely inserted position.
Figure 8B:
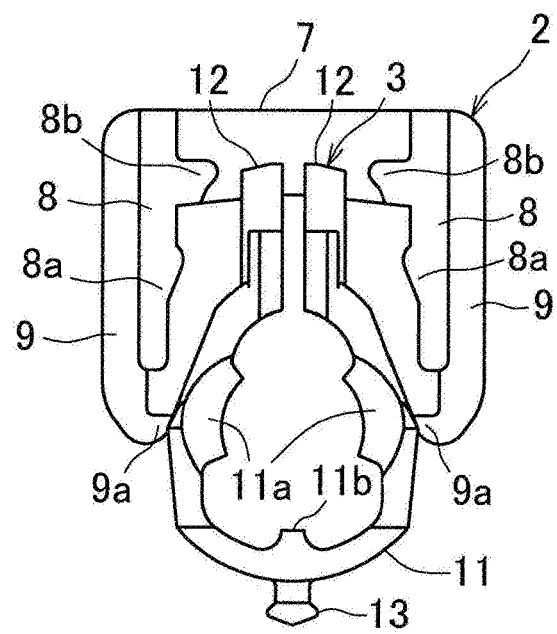
FIG. 8B A front view showing mutual positional relation between the checker and the retainer, at a time of pulling out the pipe from the connector shown in FIG. 1 and FIG. 2, wherein the checker is positioned at an intermediate position.
Figure 8C:
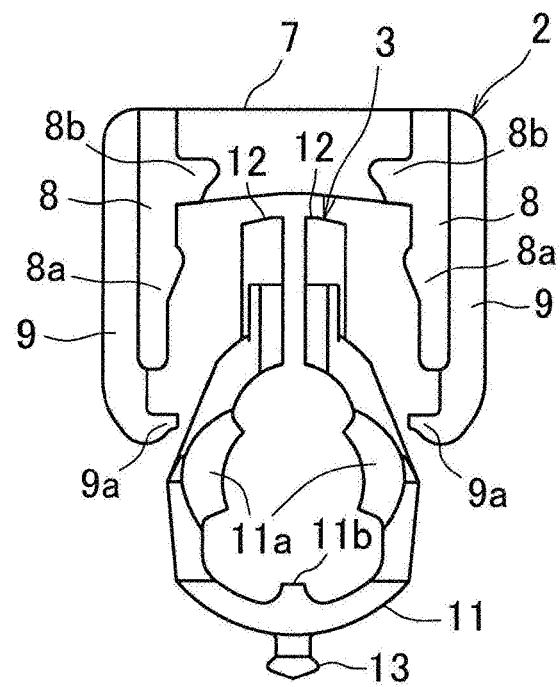
FIG. 8C A front view showing mutual positional relation between the checker and the retainer, at a time of pulling out the pipe from the connector shown in FIG. 1 and FIG. 2, wherein the checker is positioned at a temporary stopping position.

For example, in a work of maintenance or prepare of a motor bicycle, there is an occasion of removing the gasoline tank. In such a case, a pipe 50 connected to the connector 100 is temporarily pulled out from the connector 100, and then the pipe 50 is connected back to the connector 100, i.e., the connector 100 may be re-used. FIG. 8A to FIG. 8C are each a front view indicating the mutual positional relationship between the checker 2 and the retainer 3 (illustration of the connector main body 1 is omitted).

When the pipe 50 is pulled out from the connector 100, the checker 2 is lifted from the completely inserted position shown in FIG. 8A to the temporary stopping position shown in FIG. 8C, and then the pipe 50 is pulled out from the connector main body 1. In the process of pulling out the pipe 50, the spool portion 50a of the pipe 50 pushes the slope surface on the inner side (the side facing the pipe-insertion part 4) of the protrusions 11a of the main body 11 of the retainer 3, thus spreading the C-shaped main body 11. This way, the two legs 12 of the retainer 3 are also spread, and the legs 2 move over the protrusion 6a of the retainer accommodation unit 6. By even further pulling out the pipe 50, the retainer 3 swings, with its retainer lock part 13 as a fulcrum, in a direction opposite to the direction of pulling out the pipe 50, by the push of the slope surfaces on the other side of the protrusions 11a with the spool portion 50a of the pipe 50 and by a repulsive force attributed to the elastic restoring force of the main body 11 of the retainer 3. This way, the retainer 3 returns to its posture shown in FIG. 6A, before the pipe 50 is inserted (leaned against the slope surface 6f).

However, suppose that the above-described rib 8b is not provided to the retainer holding piece 8, and that the operating personnel mistakenly tries to pull out the pipe 50 while the checker 2 is not completely lifted to the temporary stopping position, i.e., while the checker 2 is in the intermediate position shown in FIG. 8B between the completely inserted position and the temporary stopping position. In this case, since there is no restriction related to the directions in which the two legs 12 of the retainer spread, a force little stronger than the proper cases will spread the C-shaped main body 11, and allow the pipe 50 to be pulled out. At this point, the upper portions of the legs 12 of the retainer 3 interfere with the lower portion of the press part and are not able to swing. Therefore, the retainer 3 is not returned to the posture shown in FIG. 6A before the insertion of the pipe 50. This allows the checker 2 to be easily pushed into the connector main body 1 (however, the check function to check the insertion of the pipe 50 is disabled).

On the other hand, in the checker 2 of the present embodiment, the rib 8b is provided to each of the retainer holding pieces 8. Therefore, when the operating personnel tries to pull out the pipe from the connector 100 while the checker 2 is in the intermediate position shown in FIG. 8B, the ribs 8b on the outer side surfaces of the two legs 12 of the retainer 3 that tries to spread, thus keeping the C-shaped main body 11 from being spread to the extent that the pipe 50 is pulled out. Therefore, the pipe 50 is not pulled out even if the operating personnel tries to pull out the pipe 50 by force.

(Functions and Effects)

As should be understood from the above explanation on the structure and movements of components of the connector 100 related to the embodiment of the present invention, with the present invention, the retainer 3 swings with the retainer lock part 13 as a fulcrum, while the retainer lock part 13 in the lower end portion of the retainer 3 is locked by the retainer-locker (locking hole 6d) in the bottom portion on the pipe insertion hole 1a side of the connector main body 1. When slide movement of the retainer not particularly restricted as in PTL 1 is compared with swinging of the retainer 3 with its locked lower end portion as a fulcrum, as in the present invention, the latter case, i.e., swinging of the retainer 3 less likely causes unintended movement of the retainer. Further, with the retainer lock part 13 in the lower end portion of the retainer 3 being locked by the retainer-locker (locking hole 6d) in the bottom portion of the connector main body 1, the retainer 3 does not get out of a predetermined position even if it is subjected to vibration due to shipping and the like situation, unless the retainer lock part 13 is disengaged from the retainer-locker (locking hole 6d).

Here, as in the present embodiment, it is preferable that the retainer-locker be the locking hole 6*d*, and that the retainer lock part 13 be locked to the bottom portion of the connector main body 1, on the side of the pipe insertion hole 1*a*, by fitting the retainer lock part 13 in the locking hole 6*d*. With the structure, it only takes a simple structure to lock the retainer 3 to the bottom portion of the connector main body 1, while being capable of swinging.

In the present embodiment, the thickness of the locking hole 6*d* (thickness of the bottom wall of the retainer accommodation unit 6) is such that the retainer lock part 13 does not protrude from the outer bottom surface of the retainer accommodation unit 6 (connector main body 1). This structure prevents interference of a finger and the like with the retainer lock part 13. Therefore, the swinging of the retainer 3 is stabilized.

Further, as in the present embodiment, a surface of the connector main body 1 which faces the pipe insertion hole 1*a* is preferably the slope surface 6*f* against which the retainer 3 is leaned. With this structure, the retainer 3 before insertion of the pipe 50 is stably kept slightly leaned, as compared with the case of no slope surface 6*f*. Further, it is possible to reduce the size of the retainer accommodation unit 6 (connector main body 1) relative to the directions of inserting and pulling out the pipe 50.

Further, as in the present embodiment, it is preferable to provide the connector main body 1 with plate members 14 which prevents swinging movement of the retainer 3 by an external force (e.g., an operating personnel mistakenly pushing), during a state in which the pipe 50 is inserted into the connector main body 1. If the retainer 3 is unintentionally swung by a finger and the like before the pipe 50 is inserted, the checker 2 is easily pushed into the connector main body 1, which spoils the checking function for confirming insertion of the pipe 50. However, the above-described structure prevents inadvertent swinging of the retainer 3 caused by an external force before the pipe 50 is inserted, and hence the check function for confirming insertion of the pipe 50. It should be noted that the plate members 14 preferably have a space such that allows insertion of a tool (flat-blade screwdriver and the like) for unlocking the checker 2.

Further, as in the present embodiment, the retainer 3 preferably includes a C-shaped main body 11 which is deformed to spread when the pipe 50 is inserted, and a pair of legs 12 extended upward from ends of the cutout portion of the main body 11. The checker 2 preferably includes: a press part 7; and a pair of retainer holding pieces 8 extended downward from both the left and right end portions of the press part 7. Further, a protrusion (rib 8*b*) is preferably provided to the inner side surface of each of the pair of the retainer holding pieces 8, the protrusion configured to prevent the main body 11 of the retainer 3 from being expanded, by abutting against the outer side surface of the pair of legs 12, when an operating personnel tries to pull out the pipe 50 from the pipe insertion hole 1*a*, while the checker 2 is positioned between the completely inserted position and the temporary stopping position. This structure prevents the pipe 50 from being pulled out from the connector when the checker 2 is not in a proper position (temporary stopping position) for pulling out the pipe 50.

(Modification)

The above-described embodiment is modifiable as follows.

The locking hole 6*d* may be a circle instead of a long hole, as long as the hole does not hinder swinging of the retainer 3.

Instead of the retainer lock part 13 whose tip is formed as an enlarged diameter portion as in the present embodiment, it is possible to adopt a retainer lock part having a hook shape, and the retainer-locker may be a rod shape so that the retainer lock part having the hook shape is hooked thereon.

Moreover, it is a matter of course that other changes or alterations can be made on the present invention within the scope of envisagement of one skilled in the art.

REFERENCE SIGNS LIST

1: connector main body
1*a*: pipe insertion hole
2: checker
3: retainer
6*d*: locking hole (retainer-locker)
6*f*: slope surface
7: press part
8: retainer holding piece
8*b*: rib (protrusion)
11: main body
12: legs
13: retainer lock parts
14: plate members
50: pipe
50*a*: spool portion (annular protrusion)
100: connector

The invention claimed is:

1. A connector connectable to a pipe having an annular protrusion on an end portion outer circumference thereof, the connector comprising:
    a connector main body having, at an end thereof, a pipe insertion hole into which the pipe is inserted;
    a checker to be pushed in from a temporary stopping position with respect to the connector main body to a completely inserted position with respect to the connector main body; and
    a retainer disposed inside the connector main body, which is configured to restrict a movement of the checker from the temporary stopping position to the completely inserted position, before the pipe is inserted into the connector main body,
    wherein the retainer has a retainer lock part in a lower end portion of the retainer, wherein a tip of the retainer lock part is formed as a diameter-enlarged portion,
    wherein a retainer-locker, which locks the retainer lock part, is provided in a bottom portion on a pipe insertion hole side of the connector main body, and
    wherein, by inserting the pipe into the connector main body from the pipe insertion hole, an upper portion of the retainer swings toward the pipe insertion hole side with the retainer lock part working as a fulcrum, thus enabling the checker to be pushed in from the temporary stopping position to the completely inserted position with respect to the connector main body.

2. The connector according to claim 1, wherein the retainer-locker is a locking hole, and the retainer lock part is locked to the bottom portion of the connector main body, on a side of the pipe insertion hole, by fitting the retainer lock part in the locking hole.

3. The connector according to claim 1, wherein a surface of the connector main body which faces the pipe insertion hole is a slope surface against which the retainer is leaned.

4. The connector according to claim 1, wherein the connector main body has a plate member which prevents swinging movement of the retainer by an external force, during a state in which the pipe is inserted into the connector main body.

5. The connector according to claim 1, wherein the retainer further comprises:
   a C-shaped main body which is elastically deformed to spread when the pipe is inserted, and
   a pair of legs extending upward from ends of a cutout portion of the C-shaped main body; and
wherein the checker further comprises:
   a press part, and
   a pair of retainer holding pieces extending downward from both left and right end portions of the press part,
   wherein a protrusion is provided to an inner side surface of each of the pair of the retainer holding pieces, the protrusion configured to prevent the C-shaped main body of the retainer from being elastically deformed and spread, by abutting against an outer side surface of the pair of legs, when operating personnel tries to pull out the pipe from the pipe insertion hole, while the checker is positioned between the completely inserted position and the temporary stopping position.

* * * * *